United States Patent
Izumi

[11] Patent Number: 5,891,036
[45] Date of Patent: Apr. 6, 1999

[54] ULTRASONIC WAVE DOPPLER DIAGNOSING APPARATUS

[75] Inventor: Mikio Izumi, Souka, Japan

[73] Assignee: Hitachi Medical Corporation, Tokyo, Japan

[21] Appl. No.: 923,932

[22] Filed: Sep. 5, 1997

[30] Foreign Application Priority Data

Sep. 11, 1996 [JP] Japan .................................. 8-240417

[51] Int. Cl.$^6$ ....................................................... A61B 8/06
[52] U.S. Cl. .......................................... 600/441; 600/455
[58] Field of Search ..................... 600/441, 455

[56] References Cited

U.S. PATENT DOCUMENTS

| | | | |
|---|---|---|---|
| 4,934,373 | 6/1990 | Angelsen et al. | 600/455 |
| 5,188,113 | 2/1993 | Sato et al. | 600/455 |
| 5,220,923 | 6/1993 | Hagiwara et al. | 600/455 |
| 5,476,097 | 12/1995 | Robinson | 600/441 |
| 5,555,514 | 9/1996 | Ri et al. | 600/455 X |

FOREIGN PATENT DOCUMENTS 5-34491  12/1993  Japan .

*Primary Examiner*—Francis J. Jaworski
*Attorney, Agent, or Firm*—Antonelli, Terry, Stout & Kraus, LLP

[57] ABSTRACT

A Doppler ultrasound diagnostic apparatus equipped with Doppler detection units and a forward/reverse separating means in an audio signal output system, a complex Doppler signal control means which stores a complex Doppler signal received during the Doppler-mode period and reads out said complex Doppler signal during the B-mode period to use as a complex Doppler signal during the B-mode period, wherein said complex Doppler signal control means includes storage means for storing complex Doppler signals that are received during the Doppler-mode period; control means for reading out complex Doppler signals stored in said storage means in a reverse order during the B-mode period; complex frequency inversion means for inverting the frequency of the complex Doppler signals read by said control means in the reverse order from said storage means; and phase rotation correction means for correcting a difference in phase at a moment when the Doppler mode is connected to the B-mode for a complex Doppler signal from said complex frequency inversion means. This decreases deterioration in the quality of a Doppler sound.

4 Claims, 7 Drawing Sheets

ULTRASONIC WAVE DOPPLER DIAGNOSING APPARATUS

BACKGROUND OF THE INVENTION

The present invention relates to a Doppler ultrasound diagnostic apparatus which transmits ultrasonic waves to a an examined part of a subject to be diagnosed, and receives ultrasonic waves from the examined part of the subject, alternately changes over, in a time-sharing manner, the operation for transmitting and receiving ultrasonic waves for obtaining a B-mode tomographic image and the operation for transmitting and receiving ultrasonic waves for obtaining complex Doppler signals in the Doppler mode, in order to measure, for example, the velocity of blood flow by the Doppler method, while observing the B-mode tomographic image of the subject in real time. More specifically, the invention relates to a Doppler ultrasound diagnostic apparatus which is capable of decreasing any deterioration in the quality of the Doppler sound.

Japanese Unexamined Patent Publication No. 5-344971 discloses a method of interpolating Doppler audio signals.

In the method of interpolating Doppler audio signals in the conventional Doppler ultrasound diagnostic apparatus, Doppler audio signals, which are not complex signals, are subjected to interpolation and, hence, the signal waveforms are not often smoothly connected, depending upon the phases of the signals at points where the Doppler signals are folded back, just before and just after the Doppler mode is changed over to the B-mode. This is because, when the data is simply read out in the reverse order, a difference in the amplitude of the signals can be eliminated, but a difference in the phase of the signals can not be eliminated. Therefore, audio signals output in the Doppler mode are distorted, and the quality of Doppler sound is deteriorated. A difference in the phase is frequently generated with an increase in the speed of the change over between the Doppler mode and the B-mode, as in the case where it is intended to improve real time performance of the Doppler ultrasound diagnostic apparatus, and the quality of Doppler sound deteriorates making it difficult to accomplish the diagnosis.

SUMMARY OF THE INVENTION

The present invention was accomplished in order to cope with the above-mentioned problem, and its object is to provide a Doppler ultrasound diagnostic apparatus capable of decreasing deterioration in the quality of Doppler sound.

In order to accomplish the above-mentioned object, a Doppler ultrasound diagnostic apparatus according to the present invention comprises:

a probe for transmitting ultrasonic waves to a subject and receiving ultrasonic waves from the subject;

a transmitter for supplying pulses or continuous waves to said probe;

an amplifier for amplifying reflected echo signals received by said probe;

a B-mode image-forming unit for forming a B-mode tomographic image from reflected echo signals received from said amplifier;

Doppler detection units for detecting, as complex Doppler signals, components that have been subjected to a Doppler shift by moving blood cells from the reflected echo signals received from said amplifier;

a frequency analyzer unit for analyzing the frequency of the complex Doppler signals detected by said Doppler detection unit;

a display system which receives image signals from said B-mode image-forming unit and analyzed signals from said frequency analyzer unit, and displays them as a B-mode tomographic image or as a frequency spectrum; and an audio signal output system which receives complex Doppler signals obtained by said Doppler detection units and outputs them as a two-channel Doppler sound; wherein the operation for transmitting and receiving ultrasonic waves for obtaining said B-mode tomographic image and the operation for transmitting and receiving ultrasonic waves for obtaining complex Doppler signals in the Doppler mode, are executed in a time-sharing manner; said apparatus being characterized in that there is provided a complex Doppler signal control means which stores a complex Doppler signal received during the Doppler-mode period, and reads out said complex Doppler signal during the B-mode period to use as a complex Doppler signal during the B-mode period.

The above-mentioned complex Doppler signal control means is provided between said Doppler detection units and a forward/reverse separating means in said audio signal output system.

The above-mentioned complex Doppler signal control means comprises:

storage means for storing complex Doppler signals that are received during the Doppler-mode period;

control means for reading out complex Doppler signals stored in said storage means in the reverse order during the B-mode period;

complex frequency inversion means for inverting the frequencies of the complex Doppler signals read by said control means in the reverse order from said storage means; and phase rotation correction means for correcting a difference in phase at a moment when the Doppler mode is connected to the B-mode for a complex Doppler signal from said complex frequency inversion means.

The above-mentioned complex frequency inversion means is constituted by means for inverting the sign of real part data or imaginary part data of the complex Doppler signals or is constituted by means which exchanges the real part data with the imaginary part data.

Furthermore, the above-mentioned complex Doppler signal control means comprises:

storage means for storing complex Doppler signals that are received during the Doppler-mode period;

control means for reading out complex Doppler signals stored in said storage means in the reverse order during the B-mode period;

complex frequency inversion means of two groups for inverting the frequencies of the complex Doppler signals read by said control means in the reverse order from said storage means;

phase rotation correction means of two groups for correcting a difference in phase at a moment when the Doppler mode is connected to the B-mode for a complex Doppler signal from said complex frequency inversion means; and weighting/adding means for weighting and adding a sequence of complex Doppler signals output from the phase rotation correction means of the two groups.

DETAILED DESCRIPTION OF THE PREFERRED EMBODIMENTS

Figure 1:
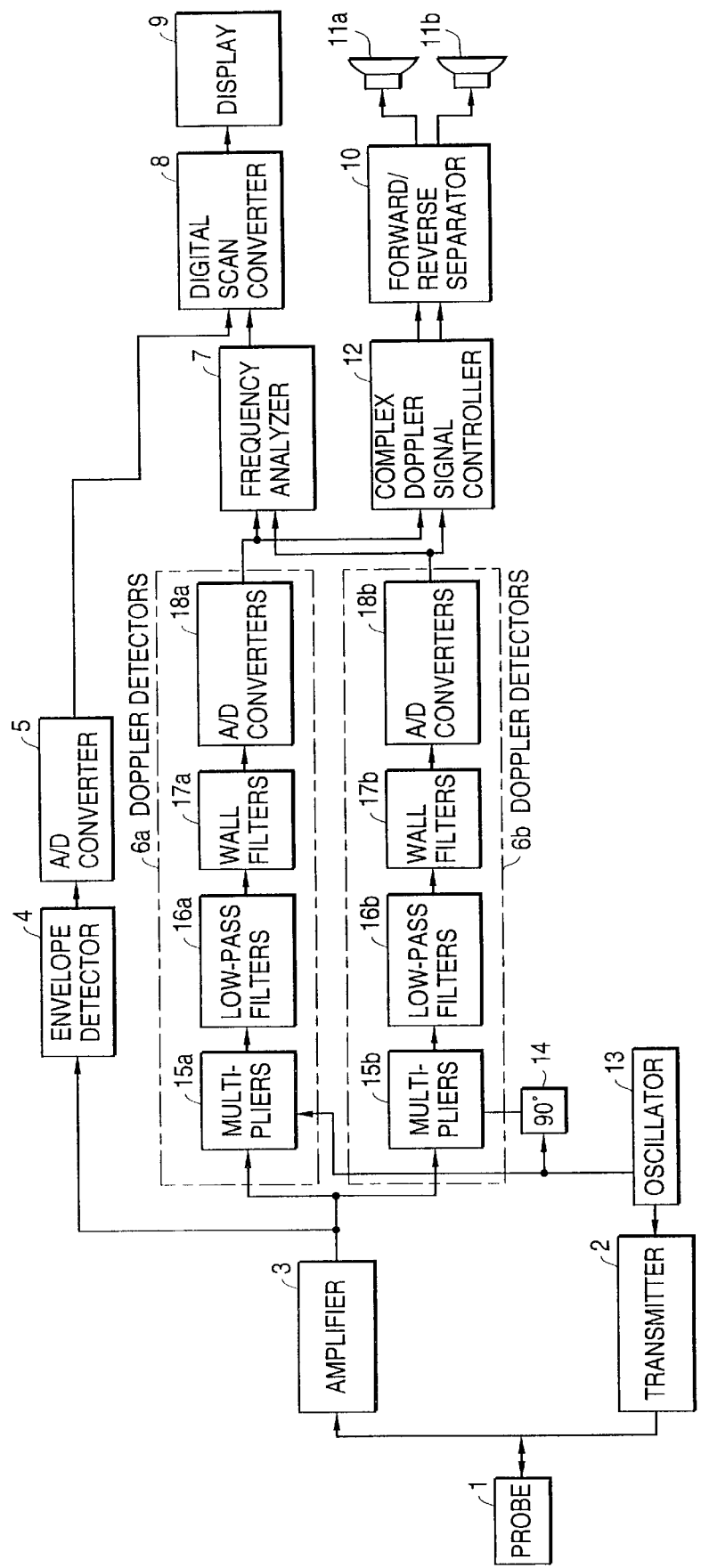
FIG. 1 is a block diagram illustrating a Doppler ultrasound diagnostic apparatus according to the present invention.

FIG. 1 is a block diagram illustrating the entire constitution of Doppler ultrasound diagnostic apparatus according to the present invention. The Doppler ultrasound diagnostic apparatus transmits ultrasonic waves to an examined part of a subject and receives ultrasonic waves from the examined part of the subject, alternately changes over in a time-sharing manner, the operation for transmitting and receiving ultrasonic waves for obtaining a B-mode tomographic image and the operation for transmitting and receiving ultrasonic waves for obtaining complex Doppler signals in the Doppler mode in order to measure, for example, the velocity of blood flow by the Doppler method, while observing the B-mode tomographic image of the subject in real time. As shown in FIG. 1, the Doppler ultrasound diagnostic apparatus comprises a probe 1, a transmitter 2, an amplifier 3, an envelope detector 4, an A/D converter 5, Doppler detectors 6a, 6b, a frequency analyzer 7, a digital scan converter (hereinafter abbreviated as "DSC") 8, a display 9, a forward/reverse separator 10, speakers 11a, 11b, as well as a complex Doppler signal controller 12.

The probe 1 transmits and receives ultrasonic waves to, and from, the examined part of the subject and, although not illustrated, contains a vibrator which is a source of ultrasonic waves for receiving reflected waves. The transmitter 2 supplies, as transmission signals, pulses or continuous waves to the probe 1, i.e., supplies pulses or continuous waves having a fixed repetitive frequency generated from an oscillator 13. The amplifier 3 amplifies echo signals reflected from the interior of the subject and received by the probe 1 and has a required gain set for amplifying the signals.

The envelope detector 4 inputs and detects signals (reflected echo signals) output from the amplifier 3 and forms video signals. The A/D converter 5 inputs video signals output from the envelope detector unit 4 and converts them into digital signals. The envelope detector 4 and the A/D converter 5 constitute a B-mode image-forming unit for forming a B-mode tomographic image from the reflected echo signals output from the amplifier 3.

The Doppler detectors 6a, 6b detect, as complex Doppler signals, the components that have been subjected to a Doppler shift via a moving body from the reflected echo signals output from the amplifier 3. The Doppler detectors 6a, 6b include multipliers 15a, 15b for multiplying the reflected echo signals from the amplifier 3 by reference waves having a phase difference of 90 degree relative to each other, depending on whether or not a 90-degree phase shifter 14 is connected to the oscillator 13. The Doppler detectors 6a, 6b further include low-pass filters 16a, 16b for quadrature detection of the output signals from the multipliers 15a, 15b to form complex base band signals, Wall filters 17a, 17b for removing echo signals reflected by static tissue by filtering the output signals from the low-pass filters 16a, 16b, and A/D converters 18a, 18b for converting the output signals of the Wall filters 17a, 17b into digital signals to output digital complex Doppler signals.

The complex Doppler signals output from the Doppler detectors 6a, 6b have phases different by 90 degrees relative to each other. When these complex signals are expressed as vectors on a complex plane, a positive Doppler shift frequency is obtained when, for example, a moving body approaches, whereby the complex vector rotates counterclockwise. When the moving body moves away, on the other hand, a negative Doppler shift frequency is obtained and the complex vector rotates clockwise. The frequency analyzer 7 analyzes the frequency spectrum of the complex Doppler signals detected by the Doppler detectors 6a, 6b, and calculates a power spectrum.

The DSC 8 receives image signals from the A/D converter 5 in the B-mode image-forming unit and the analyzed signals from the frequency analyzer 7, and executes layout processing for displaying an image. The display 9 receives image-signals from the DSC 8 and displays them as an image, which display is constituted by, for example, a TV monitor. The DSC 8 and the display 9 constitute a display system which receives image signals from the B-mode image-forming unit and analyzed signals from the frequency analyzer 7, and displays them as a B-mode tomographic image or as a frequency spectrum.

The forward/reverse separator 10 serves as means for separating the complex Doppler signals output from the Doppler detectors 6a, 6b into signals of the forward direction and signals of the reverse direction depending upon the positive sign or negative sign of the complex frequency. The two speakers 11a, 11b receive output signals from the forward/reverse separator 10 and output them as Doppler sound of two channels. In this case, the positive frequency components are output from one speaker 11a as Doppler signals indicating when the moving body approaches, and the negative frequency components are output from the other speaker 11b as Doppler signals indicating when the moving body moves away. The forward/reverse separator 10 and the two speakers 11a, 11b constitute an audio signal output system which receives complex Doppler signals obtained from the Doppler detectors 6a, 6b and outputs them as Doppler audio signals of two channels. The Doppler ultrasound diagnostic apparatus of the present invention alternately executes an operation for transmitting and receiving ultrasonic waves for obtaining the B-mode tomographic image and an operation for transmitting and receiving ultrasonic waves for obtaining complex Doppler signals in the Doppler mode in a time-sharing manner.

Figure 2:
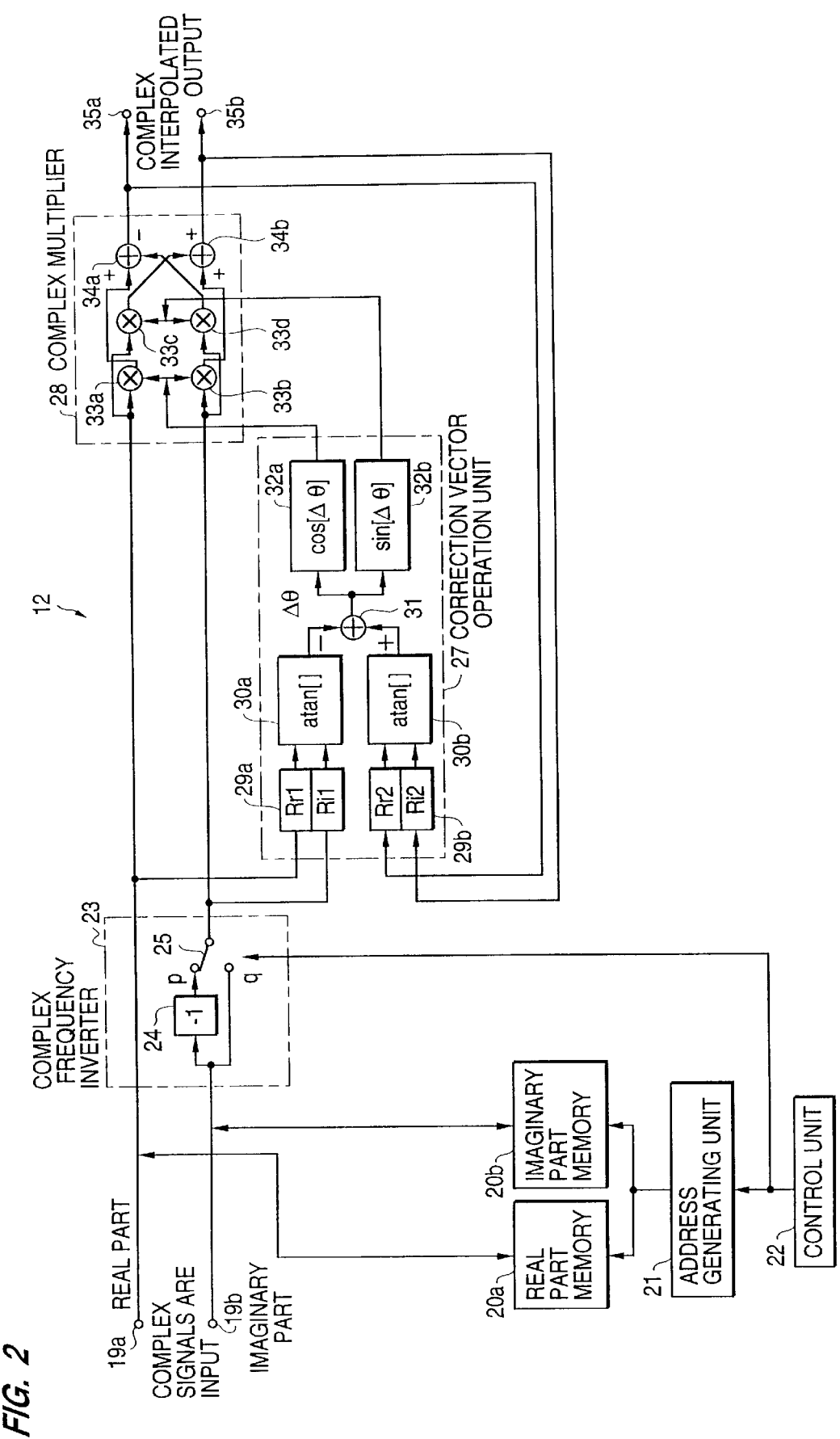
FIG. 2 is a block diagram illustrating an example of the internal constitution of a complex Doppler signal controller in the Doppler ultrasound diagnostic apparatus.

In the present invention, a complex Doppler signal controller 12 is provided between the Doppler detection units 6a, 6b and the forward/reverse separator 10 in the audio signal output system. The complex Doppler signal controller 12 serves as control means for storing a complex Doppler signal received during the Doppler-mode period and for reading out the complex Doppler sound during the B-mode period to use as a complex Doppler signal during the B-mode period. FIG. 2 concretely illustrates its internal constitution. In FIG. 2, a real part memory 20a receives complex Doppler signals from the Doppler detectors 6a, 6b through input terminals 19a, 19b, and stores real part data among the complex Doppler signals. Likewise, an imaginary part memory 20b stores imaginary part data among the complex Doppler signals. The real part memory 20a and the imaginary part memory 20b constitute means for storing complex Doppler signals that are received during the period of the Doppler mode.

An address generating unit 21 generates addresses for reading and writing the data stored in the real part memory 20a and in the imaginary part memory 20b. The control unit 22 controls the order of generation of addresses from the address generating unit 21. The address generating unit 21 and the control unit 22 constitute control means for reading, in the reverse order, the complex Doppler signals stored in the real part memory 20a and in the imaginary part memory 20b that form the storage means.

Figure 3:
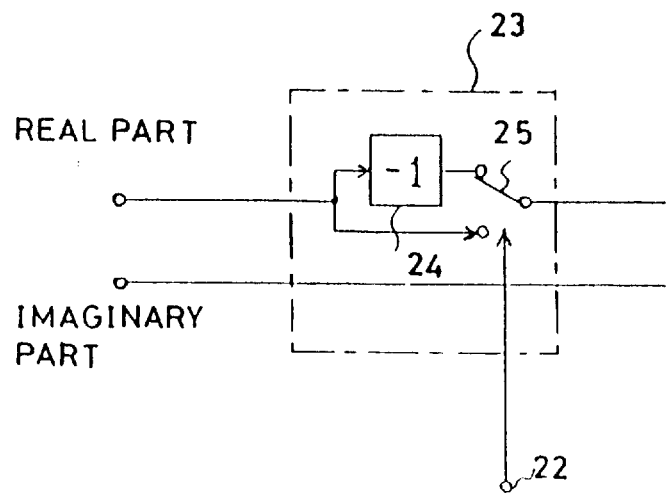
FIG. 3 is a schematic circuit diagram illustrating a complex frequency invertor in said complex Doppler signal controller.
Figure 4:
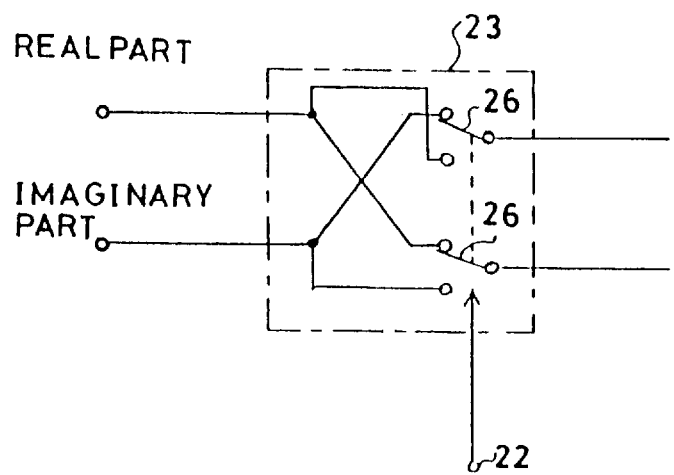
FIG. 4 is a schematic circuit diagram illustrating another constitution of the complex frequency invertor in said complex Doppler signal controller.

A complex frequency invertor 23 serves as means for inverting the frequency of complex Doppler signals read out in the reverse order from the real part memory 20a and the imaginary part memory 20b by the address generating unit 21 and the control unit 22 that form the control means. The complex frequency invertor 23 includes a sign invertor 24 and a changeover switch 25 inserted in the imaginary part and operates to invert the sign of the imaginary part data in the complex Doppler signals. Thus, a complex conjugate is accomplished for the Doppler signals read out in the reverse order, and the inversion of the time axis is eliminated, i.e., inversion of the frequency is eliminated. Not being limited thereto only, the complex frequency invertor 23 may include the sign invertor 24 and the change-over switch 25 that are inserted in the real part as shown in FIG. 3, in order to invert the sign of the real part data in the complex Doppler signals. As shown in FIG. 4, furthermore, it is further allowable to provide two change-over switches 26, 26 that are operated, while interlocked together, by a control signal from the control unit 22, on the output sides of the real part and the imaginary part, in order to exchange the real part data and the imaginary part data in the complex Doppler signals.

A correction vector operation unit 27 and a complex multiplier 28 constitute a phase rotation correction means for correcting a difference in the phase generated at a moment when the Doppler mode is connected to the B-mode for a complex Doppler signal due to a complex conjugate processing by the complex frequency invertor 23. The correction vector operation unit 27 holds, in registers Rr2, Ri2 (sign 29b), the final output data during the Doppler-mode period, holds, in registers Rr1, Ri1 (sign 29a), the initial data of interpolation during the B-mode period, finds a deviation Δθ in the phase angle by atan tables 30a, 30b of the fourth quadrant and by an adder 31, and finds a correction vector from trigonometric function tables 32a, 32b. The complex multiplier 28 corrects a difference in the phase at a point where the Doppler mode is connected to the B-mode, for a correction vector from the correction vector operation unit 27, and executes phase rotation processing for a complex Doppler signal at a moment when the B-mode has returned back to the Doppler-mode period. The complex multiplier 28 comprises a total of four multipliers 33a, 33b, 33c and 33d provided over the real part and the imaginary part, and two adders 34a, 34b. The output signal of the complex multiplier 28 is supplied, as a required complex interpolation output, to the forward/reverse separator 10 shown in FIG. 1 from output terminals 35a, 35b.

The operation of the thus constituted complex Doppler signal controller 12 will be described below with reference to FIG. 2. First, complex Doppler signals received during the Doppler-mode period are stored in the real part memory 20a for storing real part data and in the imaginary part memory 20b for storing imaginary part data, and are, at the same time, added to the complex multiplier 28 through the change-over switch 25 connected to the side of a contact point q in the complex frequency invertor 23 being controlled by the control unit 22, and are subjected to the phase rotation processing and are output. The addresses for the real part memory 20a and the imaginary part memory 20b are output from the address generating unit 21 of which the generating order of addresses is controlled by the control unit 22.

Next, in the B-mode period, the address generating unit 21 controlled by the control unit 22, generates addresses in the reverse order as that during the writing, and the complex Doppler signals are read out in the reverse order from the real part memory 20a and the imaginary part memory 20b. At this moment, the change-over switch 25 in the complex frequency invertor 23 is switched so as to be connected to the side of the contact point p being controlled by the control unit 22, so that the imaginary part of the complex Doppler signals that are read out will pass through the sign invertor 24. Thus, a complex conjugate is accomplished for the complex Doppler signals that are read out in the reverse order, and the inversion of time axis due to the reading in the reverse order is eliminated, i.e., the inversion of the frequency is eliminated. Due to the complex conjugate processing, a difference occurs in the phase at a moment when the Doppler mode is connected to the B-mode. Therefore, a difference in the phase is corrected by the phase rotation correction means constituted by the correction vector operation unit 27 and the complex multiplier 28.

That is, the correction vector operation unit 27 holds, in the registers Rr2, Ri2 (sign 29b), the final output data during the Doppler-mode period, holds in the registers Rr1, Ri1 (sign 29a) the initial data of interpolation during the B-mode period, finds a deviation Δθ of phase angle using the atan tables 30a, 30b of the fourth quadrant and by the adder 31, and finds a correction vector using the trigonometric function tables 32a, 32b. The phase angle of the correction vector is equal to an angle of a difference in the phases of complex numbers on both sides of a point where the Doppler mode is connected to the B-mode. Therefore, the complex multiplier 28 corrects the difference in the phase at the connection point.

Next, at a moment when the B-mode period has returned again to the Doppler-mode period, the complex Doppler signals are written into the real part memory 20a and into the imaginary part memory 20b and are, at the same time, added to the complex multiplier 28 through the change-over switch 25 connected to the side of the contact point q in the complex frequency invertor 23, being controlled by the control unit 22, and is subjected to the phase rotation processing and is output. Here, the registers Rr1, Ri1 (sign 29a) hold the initial data in the Doppler mode, and the registers Rr2 and Ri2 (sign 29b) hold the final data of an interpolated output in the B-mode, so that a correction vector at a new point of connection is found by the correction vector operation unit 27. The above-mentioned operation is executed while alternately changing over the operation for transmitting and receiving ultrasonic waves in the B-mode and the operation for transmitting and receiving ultrasonic waves in the Doppler mode in a time-sharing manner.

In the embodiment of FIG. 2, at a point where the B-mode period is connected to the Doppler-mode period, the data of a complex Doppler signal obtained after the moment of connection is not read out in the reverse order. Therefore, although an error occurs in the amplitude of the data at the point of connection, the distance is minimized between the data of two points on both sides of the connection point due to the phase rotation processing executed by the complex multiplier 28, and the error in the amplitude is minimized. This makes it possible to decrease noise from the level that has occurred in the Doppler audio output in the prior art.

Figure 5:
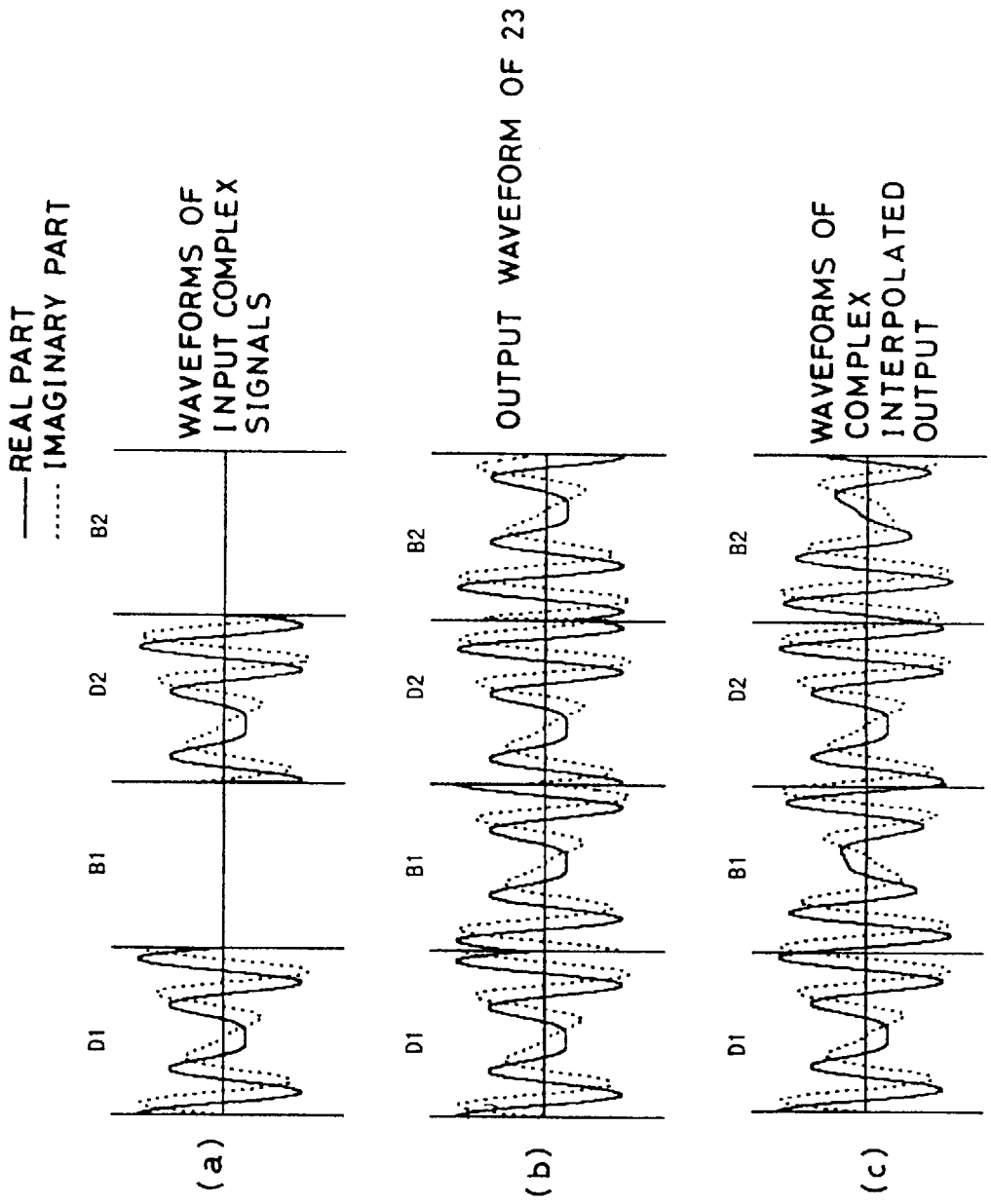
FIG. 5 is a waveform diagram for explaining signal waveforms in the operation of the complex Doppler signal controller according to the embodiment of FIG. 2.

Described below with reference to FIG. 5 are signal waveforms in the operation of the complex Doppler signal controller 12 according to the embodiment of FIG. 2. FIG. 5 shows diagrams for explaining signal waveforms on a time axis, wherein D1 and D2 denote the periods of a Doppler mode, B1 and B2 denote the periods of a B-mode, waveforms of solid lines represent real part data in the complex Doppler signals, and waveforms of broken lines represent imaginary part data. Line (a) shows input waveforms of complex signals input to the complex Doppler signal controller 12 through the input terminals 19a, 19b shown in FIG. 2. Line (b) shows output waveforms of the complex frequency invertor 23. Since these output waveforms have not yet been subjected to phase correction by the correction vector operation unit 27, a difference of phase of 180 degrees occurs at a connection point from the period D1 to the period B1 and at a connection point from the period D2 to the period B2. Line (c) shows waveforms of complex interpolated outputs from the complex signal interpolation unit 12 through the output terminals 35a, 35b after the phase is corrected by the correction vector operation unit 27 and the complex multiplier 28 so that the difference in the phase is eliminated.

Figure 6:
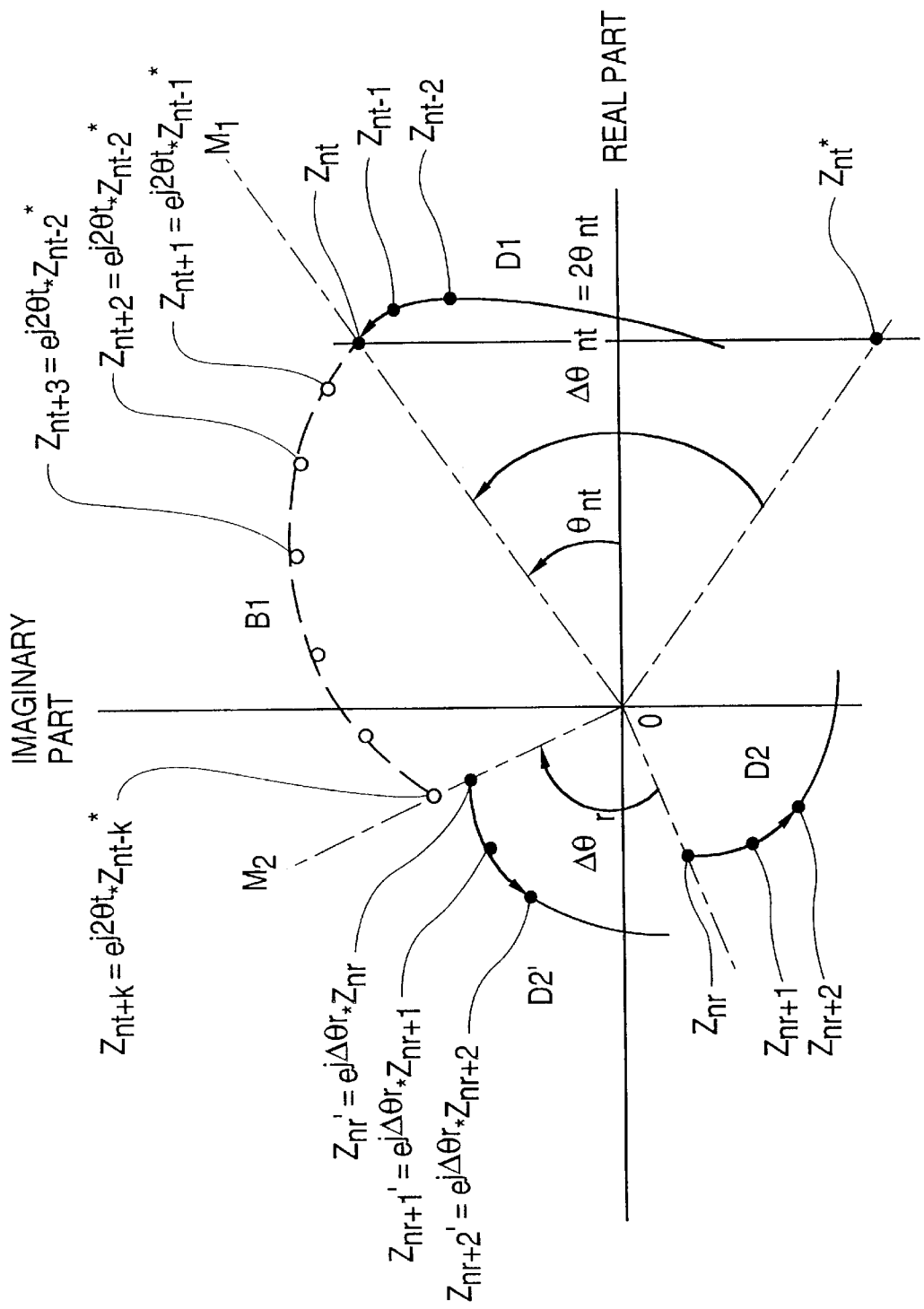
FIG. 6 is a diagram for explaining, on a complex plane of a real part and an imaginary part, the interpolation of complex Doppler signals in the operation of the complex Doppler signal controller according to the embodiment of FIG. 2.

FIG. 6 is a diagram for explaining, on a complex plane of a real part and an imaginary part, the interpolation of complex Doppler signals by the operation of the complex Doppler signal controller 12 according to the embodiment of FIG. 2. In FIG. 6, D1 and D2 denote the periods of a Doppler mode, and B1 denotes the period of a B-mode. The final data Znt in the period D1 is read out in the reverse order from the real part memory 20a and from the imaginary part memory 20b shown in FIG. 2, and is turned into Znt* through the complex conjugate operation. A difference Δθ nt in the phase angle is operated between the final data Znt and Znt*, which is the first data of interpolated data in the period B1, and a sequence of subsequent interpolated data in the period B1 is synthesized by subjecting the data found through the complex conjugate operation to phase rotation processing by Δθ nt successively. When a series of processes, such as reading the data in the reverse order, complex conjugate operation and phase rotation by Δθ nt, are geometrically viewed, it will be understood that the situation is like that when a mirror is placed at a point where the period D1 is connected to the period B1, i.e., the mirror is placed on a half line O-M1 in FIG. 6, and the time is caused to pass in the reverse way, enabling the loci of Doppler signals to be smoothly connected.

Referring to FIG. 6, a difference Δθ r exists in the phase at a point where the period B1 is connected to the period D2. By successively effecting phase rotation processing by Δθ r only, however, the difference in the phase is eliminated and a difference in the amplitude is minimized. According to the embodiment of FIG. 2, as described above, the complex Doppler signal is interpolated requiring no subsequent data after the point of interpolation. Therefore, the processing is carried out in real time with no delay.

Figure 7:
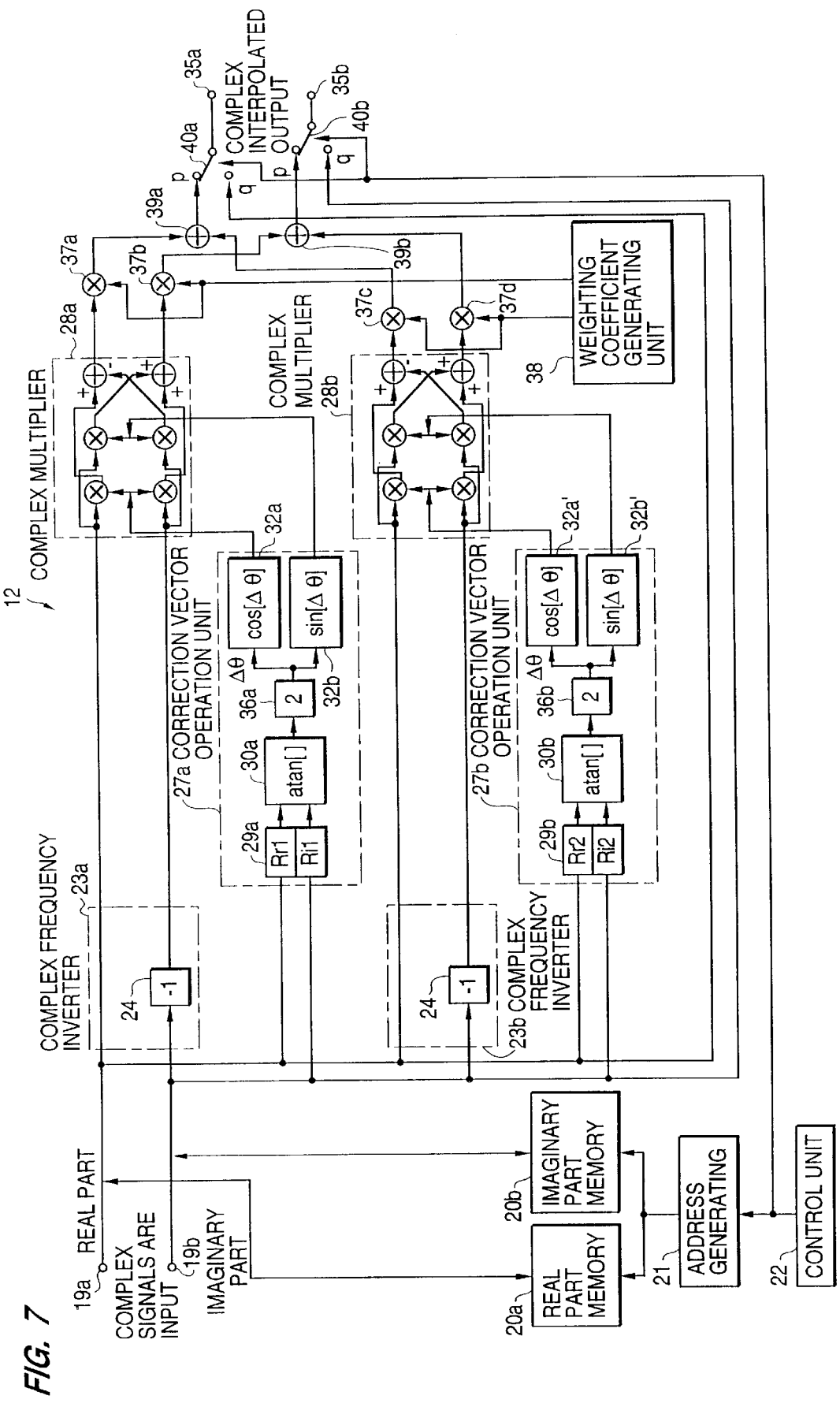
FIG. 7 is a block diagram illustrating another example of the internal constitution of the complex Doppler signal controller shown in FIG. 1.

FIG. 7 is a block diagram illustrating another internal constitution of the complex Doppler signal controller 12 shown in FIG. 1. In contrast with the embodiment of FIG. 2, the complex Doppler signal controller according to this embodiment comprises two groups (23a, 23b) of complex frequency invertors 23 and two groups of phase rotation correction means by providing two groups (27a, 27b) of correction vector operation units 27, and two groups (28a, 28b) of complex multipliers 28, and further, comprises weighting/adding means (37a to 37d, 38, 39a and 39b) for weighting and adding sequences of complex Doppler signals output from the two groups of phase rotation correction means. According to this embodiment, a difference in the amplitude at a point where the B-mode period is connected to the Doppler-mode period that existed in the embodiment of FIG. 2, is eliminated by reading, in the reverse order, the data of a complex Doppler signal obtained after the point of connection.

Described below is the operation of the complex Doppler signal controller 12 according to the embodiment of FIG. 7 constituted as described above. First, a complex Doppler signal in the Doppler-mode period is written into the real part memory 20a and the imaginary part memory 20b, and, at the same time, read out from the real part memory 20a and the imaginary part memory 20b through change-over switches 40a, 40b respectively connected to the side of the contact points q being controlled by the control unit 22 and being delayed by a time corresponding to twice the length of the period of the B-mode, and output from the output terminals 35a, 35b. Next, in the B-mode period, the complex Doppler signal written above during the Doppler-mode period is read out from the real part memory 20a and the imaginary part memory 20b in the reverse order, and is turned into a complex conjugate signal through the first complex frequency invertor 23a. The registers Rr1, Ri1 (sign 29a) in the first correction vector operation unit 27a holds the data of a final complex Doppler signal from before the B-mode period, and a value twice as great as the argument at the point of connection is found by using the atan table 30a and a multiplier 36a to obtain a correction vector. At this moment, a sequence of complex conjugated signals read out in the reverse order has been deviated in phase toward the opposite direction by an angle twice as great as the argument at the point of connection. Therefore, the first complex multiplier 28a executes the phase rotation processing in a direction for correcting the deviation in phase. Thus, the interpolation is effected so that the amplitude and phase become continuous at a point of connection.

Next, at a point where the B-mode period is connected to the Doppler-mode period, the complex Doppler signals after the B-mode period are read out in the reverse order from the real part memory 20a and the imaginary part memory 20b, and are turned into complex conjugate signals through the second complex frequency invertor 23b. The registers Rr2, Ri2 (sign 29b) in the second correction vector operation unit 27b hold the data of a first complex Doppler signal after the B-mode period, and a value twice as great as the argument at the point of connection is found from the atan table 30b and a multiplier 36b thereby to obtain a correction vector. At this moment, the sequence of complex conjugate signals read out in the reverse order is deviated in phase toward the opposite direction by an angle twice as great as the argument at the point of connection. Therefore, the second complex multiplier 28b executes phase rotation processing in a direction to correct the phase deviation. Thus, similar to the above, the interpolation is effected so that the amplitude and phase become continuous at the point of connection.

Next, the two groups of complex Doppler signals synthesized and interpolated from the complex Doppler signals before and after the B-mode period are subjected to weighting/adding by means of the weighting/adding means constituted by a weighting coefficient generator 38, multipliers 37a, 37b, 37c, 37d provided in a number of two for each of the groups, and two adders 39a and 39b, so that between those having corresponding time series, the weighting to complex signals synthesized from the Doppler signals before the B-mode period become great for the beginning of the B-mode period, and the weighting is shifted, toward the end of the B-mode period, to the complex signals synthesized from the Doppler signals after the B-mode period. The thus found complex interpolated output is output from the output terminals 35a, 35b through change-over switches 40a, 40b connected to the side of the contact points p being controlled by the control unit 22, and is supplied to the forward/reverse separator 10 shown in FIG. 1.

Figure 8:
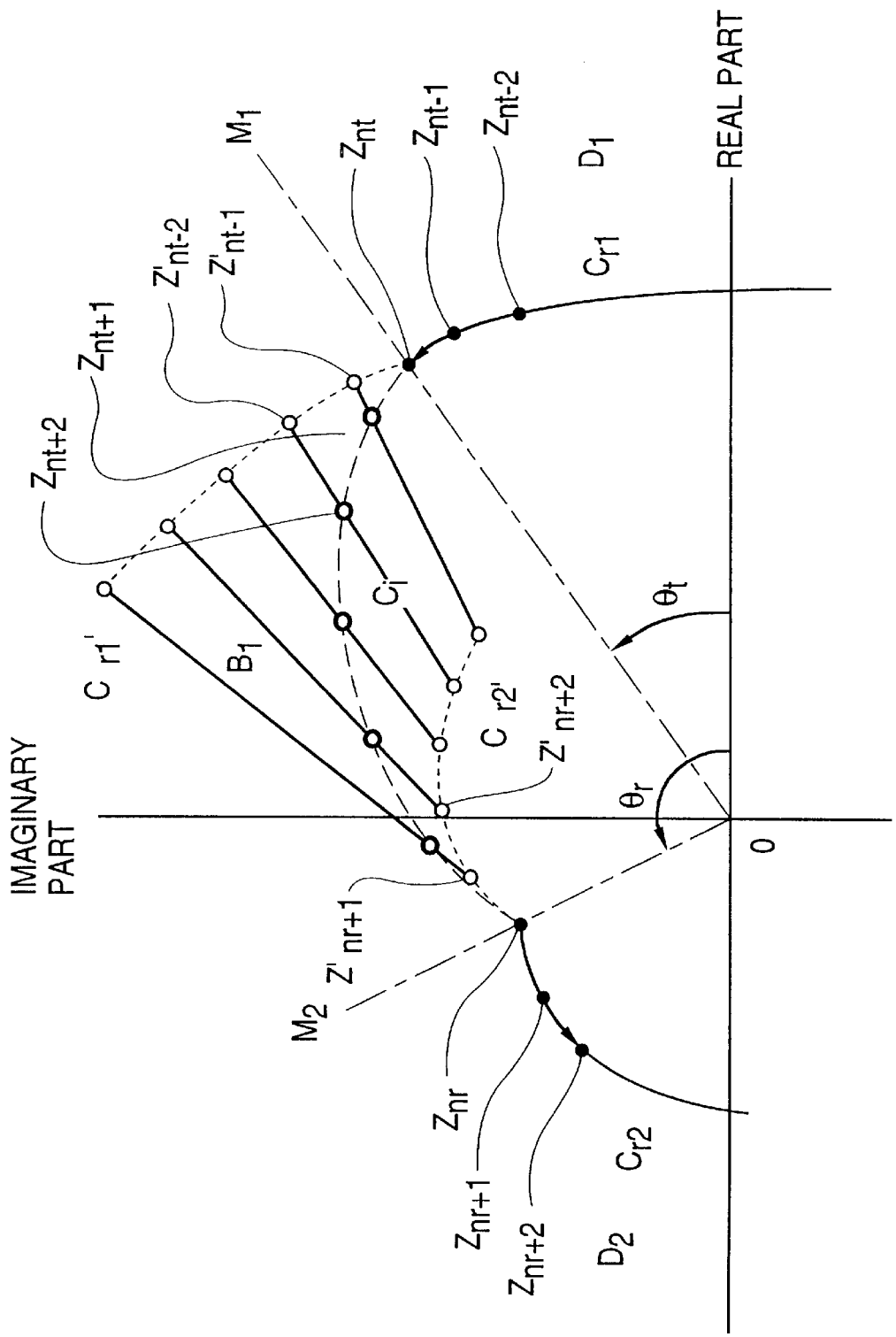
FIG. 8 is a diagram for explaining, on a complex plane of a real part and an imaginary part, the interpolation of complex Doppler signals in the operation of the complex Doppler signal controller according to the embodiment of FIG. 7.

FIG. 8 is a diagram for explaining, on a complex plane of a real part and an imaginary part, the interpolation of the complex Doppler signals by the operation of the complex Doppler signal controller 12 according to the embodiment of FIG. 7. In FIG. 8, D1 and D2 denote the periods of a Doppler mode, and B1 denotes the period of a B-mode. In the connection from the Doppler mode in the period D1 to the B-mode in the period B1, the data Cr1 of the complex Doppler signal in the period Di is symmetrically folded relative to a half line O-M1 due to reading of the data in the reverse order, complex conjugation and phase rotation correction processing is carried out, and the data is turned into data Cr1' represented by a broken line. In the connection from the B-mode in the period B1 to the Doppler mode in the period D2, the data Cr2 of the complex Doppler signal in the period D2 after the B-mode is symmetrically folded relative to a half line O-M2 due to reading of the data in the reverse order, complex conjugation and phase rotation correction processing is carried out, and the data is turned into data Cr2' represented by a broken line. The weighting/adding is effected by the weighting/adding means (37a to 37d, 38, 39a and 39b) shown in FIG. 7, and a complex interpolation signal Ci is obtained in the period B1 as represented by a dot-dash chain line in FIG. 8. In this embodiment, the Doppler signals during the Doppler-mode period before and after the B-mode period are utilized for the interpolation processing for finding complex Doppler signals in this B-mode period by the interpolation. Therefore, the interpolation processing inevitably involves a time lag twice as long as the B-mode period. As is obvious from FIG. 8, however, there are obtained smoothly connected interpolated signals without almost any difference in the amplitude or in the phase.

I claim:

1. An ultrasonic wave Doppler diagnosing apparatus for performing a scan operation by switching between a Doppler-mode and a B-mode, comprising:

Doppler detection units for detecting complex Doppler signals;

complex Doppler signal control means responsive to an output from the Doppler detection units; and forward/reverse separating means responsive to the complex Doppler signal control means for providing an output;

wherein said complex Doppler signal control means includes storage means for storing real part data and imaginary part data of the complex Doppler signals, control means for reading out the stored complex Doppler signals in reverse order during a B-mode period, complex frequency inversion means for inverting frequencies of the read out complex Doppler signals, and phase rotation correction means for rotating phases of the frequency inverted complex Doppler signals to correct a difference in phase at a time of a switching connection from the Doppler-mode to the B-mode.

2. An ultrasonic wave Doppler diagnosing apparatus according to claim 1, wherein the complex frequency inversion means include means for at least one of inverting a sign of the real part data and the imaginary part data of the complex Doppler signals and exchanging the real part data with the imaginary part data.

3. An ultrasonic wave Doppler diagnosing apparatus according to claim 1, wherein the complex Doppler signal control means includes two groups of the complex frequency inversion means, two groups of the phase rotation correction means, and weighting/adding means for weighting and adding a sequence of complex Doppler signals output from the two groups of phase rotation correction means.

4. An ultrasonic wave Doppler diagnosing apparatus according to claim 1, further comprising:

a probe for transmitting ultrasonic waves to a subject and receiving ultrasonic waves from the subject;

a transmitter for supplying pulses or continuous waves to the probe;

an amplifier for amplifying reflected echo signals received by the probe;

a B-mode image-forming unit for forming a B-mode tomographic image from the reflected echo signals from the amplifier;

the Doppler detection units detecting as the complex Doppler signals, components that have been subjected to a Doppler shift via moving blood cells from the reflected echo signals from the amplifier;

a frequency analyzer unit for analyzing the frequency of the complex Doppler signals detected by the Doppler detection units;

a display system which receives image signals from the B-mode image-forming unit and analyzed signals from the frequency analyzer unit, and provides a display as a B-mode tomographic image or as a frequency spectrum; and an audio signal output system which receives the output from the forward/reverse separating means and provides an output as two-channel Doppler audio sounds.

* * * * *